United States Patent [19]

Greenbaum

[11] 4,422,813
[45] Dec. 27, 1983

[54] WALL EXPANSION DEVICE WITH ANCHORING SOCKET

[76] Inventor: Sheldon Greenbaum, 11651 Stoneview Sq., Reston, Va. 22091

[21] Appl. No.: 240,625

[22] Filed: Mar. 5, 1981

[51] Int. Cl.$^3$ .............................................. F16B 13/06
[52] U.S. Cl. .......................................... 411/38; 411/15
[58] Field of Search .................... 411/15, 34, 35, 36, 411/37, 38, 39, 42, 43, 63, 66, 340, 341, 342, 343, 345, 346, 548; 29/226.4; 403/2, 11, 21

[56] References Cited

U.S. PATENT DOCUMENTS

| | | | |
|---|---|---|---|
| 1,365,719 | 1/1921 | Ogden | 411/34 |
| 2,236,079 | 3/1941 | Wipper | 411/38 |
| 2,559,281 | 7/1951 | Croessant | 411/38 |
| 3,222,449 | 5/1966 | Becker | 411/34 X |
| 3,236,143 | 2/1966 | Wing | 411/34 |
| 3,257,889 | 6/1966 | Fischer | 411/34 X |
| 3,369,442 | 2/1968 | Darby et al. | 411/34 |
| 3,487,745 | 1/1970 | Brunelle | 411/39 |
| 3,513,746 | 5/1970 | Forsberg | 411/346 |
| 3,888,156 | 6/1975 | Fima | 411/38 |

FOREIGN PATENT DOCUMENTS

| | | | |
|---|---|---|---|
| 212600 | 7/1956 | Australia | 411/38 |
| 1505595 | 3/1978 | United Kingdom | 411/38 |

*Primary Examiner*—Thomas J. Holko

[57] ABSTRACT

A device to secure an ornament or fixture to the surface of a panelled wall which device is inserted, made immobile and is easily removed from a surface-to-surface boring in the wall, characterized by a multi-part, longitudinally collapsible shaft with anchoring socket, the die-cut, weakened sides of which, when fitted into the wall and when driven clockwise at its tapered threaded base by a removable screw, compress and widen under the force generated by the screw to expand and tighten against the interior surface of the wall furthest from the point of insertion thereby preventing movement of the socket when it is located inside the wall boring, having also the means for removal by the introduction of a rigid insert of a length to reach the tapered, compressed section of the multi-part shaft so that separation of the expanded section of the shaft from the unexpanded section of the shaft occurs when the protruding end of the insert is struck with sufficient force to unsnap the parts of the shaft and the expanded section alone is additionally propelled in the direction of the force and falls inside the panelled wall at its base thereby permitting the remaining unexpanded section of the socket to be completely removed from the wall boring.

4 Claims, 6 Drawing Figures

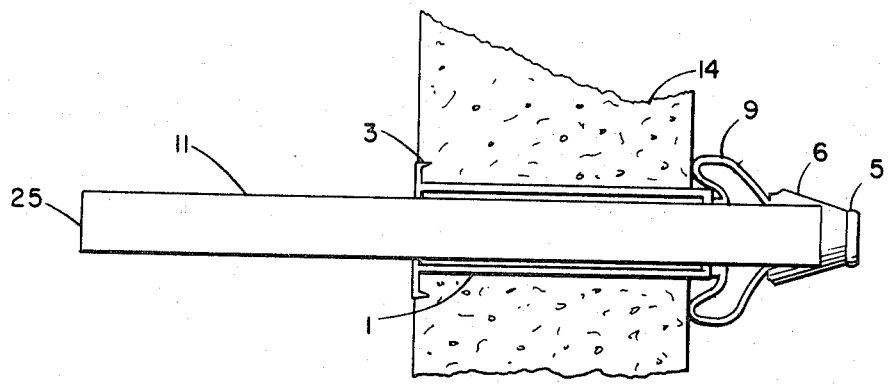
FIG. 4
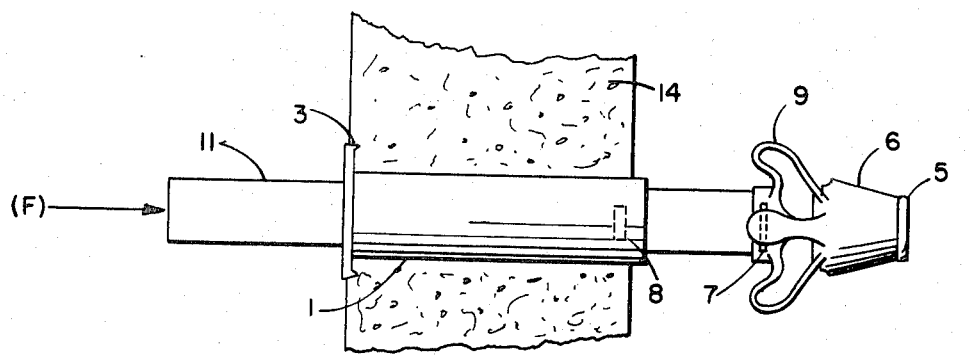
FIG. 5
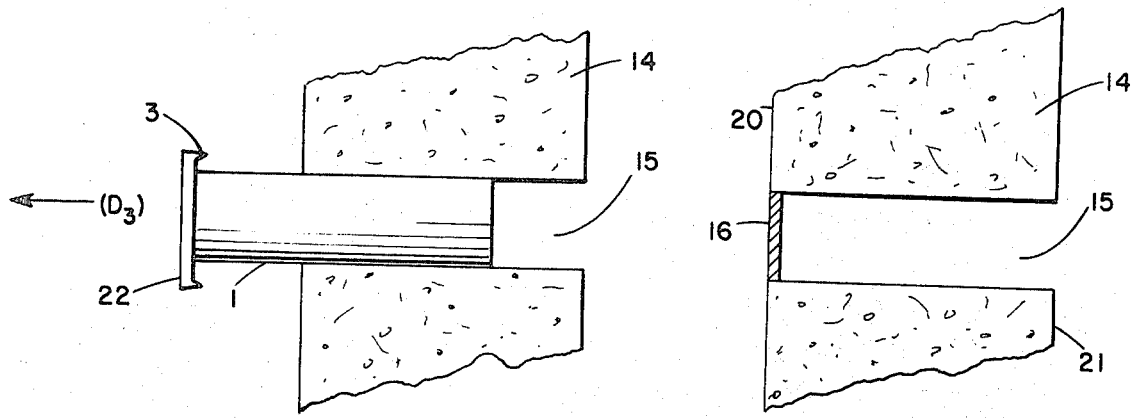
FIG. 7
FIG. 8

WALL EXPANSION DEVICE WITH ANCHORING SOCKET

This invention relates to a device for securing objects to the surface of a wall or similar construction which also has the novel characteristic of being easily removed without damaging the wall.

Home owners, tenants, landlords and others frequently change and rearrange the decorative ornaments and fixtures on the walls of their residences. The accepted practice is to determine the location for an object on a wall and then drill or punch through the exterior wall surface into the hollow interior of the wall section. A narrow gauge wall boring results into which a commercially available expansion bolt or other spreading mechanism is inserted and activated. These currently available devices have an advantage for successfully securing wall objects.

However, when a resident desires to relocate the wall object, the disadvantage of these devices becomes clear: severe damage to the wall occurs when the expanded device is forcibly removed and the resulting large gouged area must be filled, sanded and refinished. Removal of the device is necessary for cosmetic reasons if the wall boring will no longer be concealed behind a wall object.

Removing an expansion mechanism is currently accomplished by prying the expanded device out of the wall or by cutting off the raised rim of the device which lies on the surface of the wall. By either of these conventional methods, the surface of the wall becomes scarred with marks, ruts or scratches which must be laboriously repaired.

The present invention has for its principal object the provision of a novel, useful mechanism characterized as a wall expansion device which can be removed without causing wall damage.

Another object is to provide a means of affixing objects to a wall so as to prevent their movement.

Another object is to provide such a device having a socket with a multi-part shaft and the means for separating the shaft into its constituent sections.

A further object is to provide a means for removal of the sections of the socket from the wall boring.

Other objects, features and advantages of the present invention will be apparent from the following description of an embodiment thereof illustrated in the accompanying drawings in which:

FIG. 4 is a view of the device as removal is made possible when the rigid insert is introduced into the shaft and encounters the tapered end of the socket;

FIG. 5 shows the rigid insert acting in combination with the two-part shaft to produce separation after sufficient force has been applied to the protruding end of the rigid insert;

FIG. 7 is a view of the unexpanded section of the shaft as it is easily removed from the surface-to-surface wall boring;

FIG. 8 shows the undamaged wall boring simply filled with a small quantity of wall plaster or other suitable material.

Figure 1:
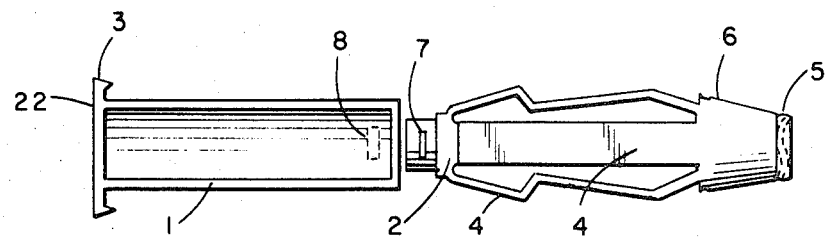
FIG. 1 is a view showing the multi-part shaft with anchoring socket and the manner in which it snaps together.

When a home owner or resident of a dwelling wishes to affix an ornament or object to the surface of a wall typically constructed of gypsum product or wood panelling, a wall expansion device with an accompanying screw-bolt is customarily inserted into a boring made in the wall. It is common practice for the occupant to utilize a currently available commercially manufactured mechanism characterized as a hinged plastic insert or a combination screw-bolt with anchoring socket. The currently available devices perform satisfactorily while they remain in place but create severe problems when they are removed from walls as residents reposition their wall objects or as landlords prepare dwellings for occupancy by new tenants. Due to their present construction, efforts to remove wall expansion devices are limited to clumsily prying them out with screwdrivers or to using hacksaws to cut off the protruding rims of the anchoring sockets which themselves are held firmly and almost immoveable, being tight and flush against the wall surfaces. These methods are time consuming and predictably result in serious damage to the wall as deep gouges and scratches are created. Once the wall device is activated, the section inside the wall expands so that it can no longer pass through the wall boring into which it was initially inserted. Wall damage occurs from forced removal or from the use of hand tools in an attempt to cut the protruding rim from the socket of the device.

The present invention eliminates the necessity to extract the expanded socket from the original wall boring and no longer requires destruction of the device and the unintentional disfiguring of the wall in the process. An individual using the mechanism of this invention can install and easily remove a wall expansion device without inflicting damage to the wall's interior or exterior surfaces. Activating the wall expansion device by means of the present invention is accomplished by snapping together the multipart collapsible shaft and inserting this unified structure into the boring of a panelled wall. A threaded screw is introduced into the shaft and is rotated so that while it engages the threaded base of the shaft, the weaker sides of the shaft collapse, expand outwardly and are simultaneously drawn toward the interior surface of the wall as the force generated by the threading motion of the screw is transmitted. Removing the wall expansion device by means of the present invention is accomplished by introducing a rigid insert of sufficient length into the shaft so that the insert will reach the tapered base of the shaft. When the insert is struck with sufficient external force, the shaft will unsnap and again be separated into its two constituent parts. The shaft's expanded section alone can then be pushed into the hollow space between the wall boards and the shaft's unexpanded section is now free to be lifted out of the wall boring without difficulty. The small hole that remains in the wall is cleanly and easily filled.

Figure 2:
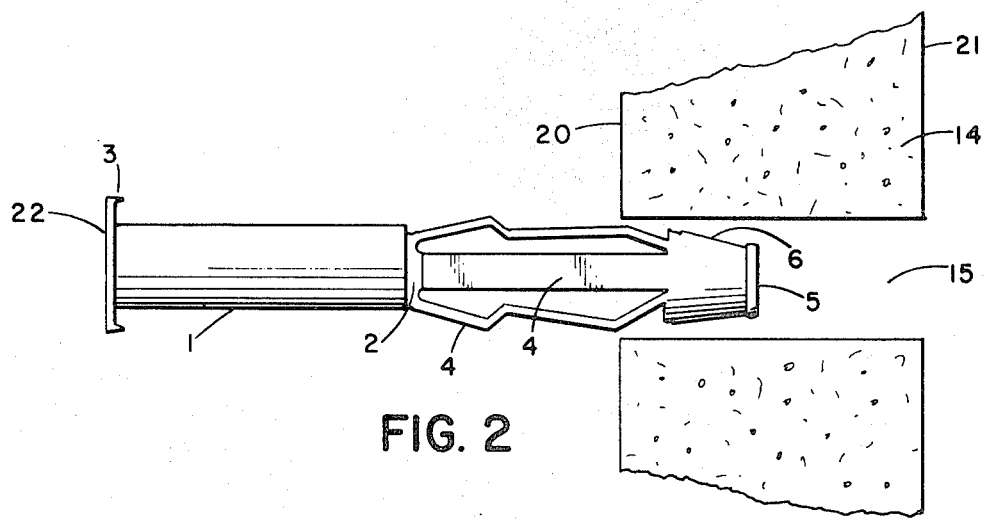
FIG. 2 illustrates the unified device as it is being inserted into a surface-to-surface wall boring.
Figure 3:
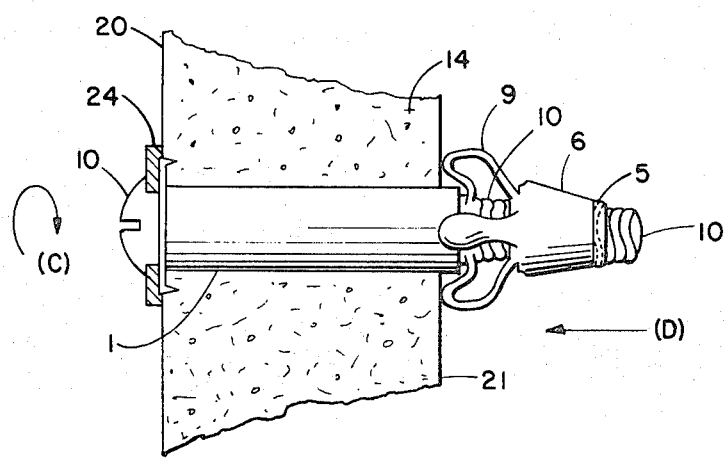
FIG. 3 is a view showing the device in the securing position after force generated by the threaded screw is directed through the shaft's threaded base causing activation of the expanding section preventing movement at either end of the device.

Referring to FIGS. 1, 2 and 3 of the drawings accompanying this application, the device is made relatively lightweight yet sturdy enough to withstand the hanging weight of a wall object and to successfully permit snapping together and unsnapping apart when appropriate force is transmitted in the required direction. A longitudinally collapsible shaft is composed of a section which does not expand throughout the performance of the device (1) and a section which only expands when activated (2). The sections are joined into a single unit prior to insertion into the surface-to-surface wall boring (15) by means of a snap or other suitable joining mechanism in which the raised area (7) of the expandable section (2) is pressed into the recessed receptacle (8) of the unexpanded section (1). The snap (7) and its receptacle (8) are of such depth and dimension that after being joined, they are capable of creating sufficient resistance to the force generated by the accompanying threaded screw (10) thereby enabling the weakened die-cut sides (4) of the expandable section (2) to collapse. The unified structure is made immobile after it is fully inserted into the wall boring (15) by applying pressure sufficient to embed the gripping structures (3) of the anchoring socket (22) into the exterior surface (20) of the wall board (14).

The expanded section (2) is activated when the threaded screw (10) is inserted through the hollow shaft of the unexpanded section (1) and is continued through the hollow shaft of the expandable section (2) so that the threaded screw (10) engages the complimentary threads (5, in phantom) in the base of the expandable section (2). Rotation of the threaded screw (10) in the clockwise direction (C) causes the weakened, die-cut sides (4) on the shaft of the expandable section (2) to spread, collapse and travel in the indicated direction (D) towards the interior surface (21) of the wall board (14). The expanded section, now fully activated (9), encounters the interior surface (21) of the wall board (14) and its movement is halted as the gripping structures (3) of the anchoring socket (22) combine to function as a clamp immobilizing the entire assembly.

An object is affixed to the wall by removing the threaded screw (10) and positioning a portion of the wall object or its attached bracket (24, illustrated in cross-section) between the anchoring socket (22) and the head of the threaded screw (10) which is reinserted and then retightened to prevent movement.

Figure 6:
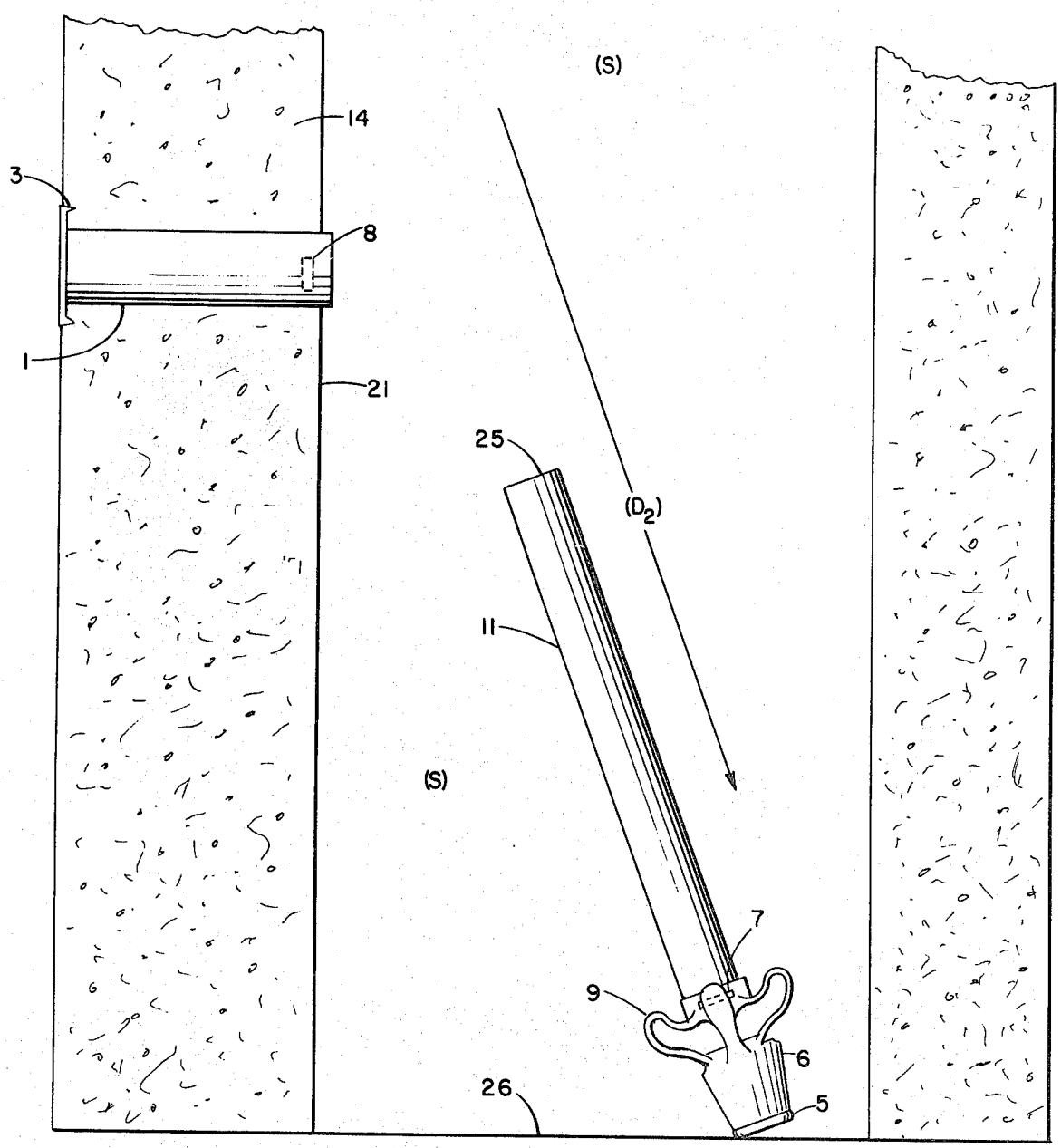
FIG. 6 illustrates the expanded section completely separated from the unexpanded section by means of the rigid insert which itself may remain wedged into the tapered end of the socket as shown, or which may be pulled out of the tapered end, to be used again.

FIGS. 4, 5 and 6 illustrate the separation and removal processes of the mechanism in which the rigid insert (11) is located inside the hollow shaft of the unexpanded section (1), as it is continued through the hollow shaft of the fully activated section (9), and as it physically splits the shaft into its original parts (F, $D_1$, $D_2$). When appropriate force is applied against the top (25) of the rigid insert (11) its opposite end engages tapered portion 6 and the snap mechanism (7) is disengaged from its receptacle (8, in phantom) thereby permitting the fully activated section (9) to separate from the unexpanded section (1). The fully activiated section (9) travels in the indicated direction ($D_1$) and is completely disengaged from the unexpanded section (1). The fully activated section (9) falls to the interior base (26) of the panelled wall in the indicated direction ($D_2$) as the fully activated section (9) and the rigid insert (11) as well, are propelled into the interior wall space (S) leaving only the unexpanded section (1) remaining inside the wall board (14). If desired, the rigid insert (11) can be reused by preventing its fall to the inaccessible interior base (26) of the panelled wall. After separation has occured, the rigid insert (11) and the fully activated section (9) are together simply pulled in the opposite direction from the force (F) which created the initial separation so that the rigid insert (11) is removed from the fully activated section (9) when the movement of the fully activated section (9) is stopped by encountering the interior surface of the board (21). The fully activated section (9) will then fall alone to the interior base (26) of the panelled wall.

In FIG. 7, the anchoring socket (22) is removed from the wall board (14) by easily lifting it out of the wall boring (15) in the indicated direction ($D_3$).

FIG. 8 shows the wall board (14) with its wall boring (15) newly sealed on the exterior surface (20). Plaster, putty or other suitable wall patching material (16) is used to fill the exterior opening of the wall boring (15).

The foregoing detailed description is given for clearness of understanding only and no unnecessary limitations are to be understood therefrom, as modifications will be obvious to those skilled in the art.

I claim:

1. A device for securing an object to a hollow wall surface comprising a first hollow tube member having wall-engaging means at one end, a second hollow tube member having a plurality of longitudinally extending slots spaced about its outer surface, means for removably fastening the other end of said first member to one end of said second member in longitudinal alignment of said members for insertion into an opening through said wall surface, the interior surface of said other end of said second member being provided with threads for receiving a threaded portion of a fastening member extending longitudinally through said joined hollow members, a portion of said second tube member adjacent said threaded end tapering inwardly toward said threaded end, said second member being adapted to collapse radially outwardly along said slots and into contact with the adjacent wall surface as a fastening member is threaded through said threaded end of said second member, said second member being capable of being unfastened from said first member by means extending through said longitudinally aligned hollow members and engaging the inner wall surface of said tapered portion with a force sufficient to unfasten said second member from said first member and cause said second hollow member to fall within said hollow wall.

2. The device as defined in claim 1 wherein said means for removably fastening said hollow members together comprise a raised snap portion on one end of either said first and second members and a recessed portion on the other of said members suitable for receiving said snap portion therein.

3. The device as defined in claim 2 wherein said raised snap portion is at one end of said second member and said recessed portion is at said other end of said first member, said first and second members being in removably fastened engagement when said end of said second member is inserted within said other end of said first member and the raised snap portion engages the recessed portion.

4. The device as defined in claim 1 wherein said wall-engaging means at one end of said first hollow member comprises an anchoring socket disposed about and integral with said other end, said socket having a plurality of prongs adapted for gripping engagement with the outer surface of a wall.

* * * * *